United States Patent
Gao et al.

(10) Patent No.: US 8,116,375 B2
(45) Date of Patent: Feb. 14, 2012

(54) METHOD FOR OBTAINING MOTION VECTOR AND IMAGE REFERENCE BLOCK IN A CODE MODE OF FIXED REFERENCE FRAME A NUMBER

(75) Inventors: Wen Gao, Beijing (CN); Xiangyang Ji, Beijing (CN); Siwei Ma, Beijing (CN); Debin Zhao, Beijing (CN); Yan Lu, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 1368 days.

(21) Appl. No.: 10/584,762

(22) PCT Filed: Jul. 19, 2004

(86) PCT No.: PCT/CN2004/000827
§ 371 (c)(1),
(2), (4) Date: Jun. 27, 2006

(87) PCT Pub. No.: WO2005/067299
PCT Pub. Date: Jul. 21, 2005

(65) Prior Publication Data
US 2007/0116123 A1    May 24, 2007

(30) Foreign Application Priority Data
Dec. 31, 2003    (CN) .......................... 2003 1 0116089

(51) Int. Cl.
*H04N 7/12*    (2006.01)
(52) U.S. Cl. .................................. 375/240.16
(58) Field of Classification Search .............. 375/240.16
See application file for complete search history.

(56) References Cited

U.S. PATENT DOCUMENTS
7,327,788 B2 *   2/2008   Kadono et al. ........... 375/240.16
2002/0168008 A1   11/2002   Ishikawa FOREIGN PATENT DOCUMENTS
CN          1302510 A      7/2001
CN          1336080 A      2/2002
WO      WO 03/063508 A1    7/2003

\* cited by examiner

*Primary Examiner* — Jay Patel
*Assistant Examiner* — Richard Torrente
(74) *Attorney, Agent, or Firm* — J.C. Patents

(57) ABSTRACT

A method for obtaining an image reference block in a code mode of fixed reference frame number includes the steps of: performing motion estimation for each block of a current B frame and obtaining a motion vector MV of a corresponding block of a backward reference frame; discriminating whether the motion vector is beyond a maximum forward reference frame which is possibly pointed by the B frame, if not, then calculating the forward and backward motion vectors in a normal way; if yes, then using the motion vector of the forward reference frame that the B frame can obtain in the same direction to replace the motion vector of the corresponding block in the backward reference, and calculating the forward and the backward motion vectors of the B frame; finally, two image blocks pointed by the final obtained forward and backward motion vectors as the image reference blocks corresponding to the macro block. The present invention solves the possibly appeared problem of un-matching motion vectors, and can guarantee the coding efficiency to the largest extent.

3 Claims, 2 Drawing Sheets

METHOD FOR OBTAINING MOTION VECTOR AND IMAGE REFERENCE BLOCK IN A CODE MODE OF FIXED REFERENCE FRAME A NUMBER

FIELD OF THE INVENTION

The present invention relates to a method for obtaining a reference block in image coding/decoding of digital video compression field, and more particularly to a method for obtaining an image reference block in a code mode of fixed reference frame number, which belongs to the field of image compression technology.

BACKGROUND OF THE INVENTION

High-efficient video coding/decoding technology is the key of realizing storing and transmitting multimedia data at high quality and low cost. The present popular international standards for images coding are based on this coding theory which adopts coding method combining motion compensation based on block matching, discrete cosine transform and quantization. Typically, The first joint technology committee of international standards organization/International Electro-technical Commission (ISO/IEC JTC1) proposes motion picture experts group (namely to MPEG)-1, MPEG-2 and MPEG-4 and such international standards; and the International Telecom Union (ITU-T) proposes the H.26x series. These video coding standards are widely used in the industries.

All these standards for video coding adopt Hybrid Video Coding strategy normally including four main modules such as predicting, transforming, quantizing, information entropy coding etc. wherein, the main function of predicting module is to predict the current image to be coded by using the coded and reconstructed image, namely inter prediction, or to predict the current image block (macro block) to be coded by using the coded and reconstructed image block (or macro block) in images, namely intra prediction; the function of the transforming module is to convert the image block inputted into another space so as to converge the energy of inputted signals at transform coefficient of low frequency for lowering relativity within the elements of image block and being useful for compressing; the main function of quantizing module is to map the transformed coefficients into a limited element aggregate advantageous to coding; and the main function of information entropy coding module is to represent the quantized transform coefficient with variable length code according to statistical rule. The video decoding system has similar modules, mainly to reconstruct the decoded image of the inputted code stream through the procedures of entropy decoding, inverse quantizing, inverse transforming, etc.

The main function of the prediction based on motion compensation is to reduce redundancy of video series on time. Most coding efficiency for video comes from the predicting module. The procedure of the video coding is to code each frame image of video series. The conventional video coding system which codes each frame image is based on macro block as a basic unit. When encoding the current macro block, the motion vector is involved in connecting the current macro block with the reference block. When encoding each frame image, there are situations which can be divided into intra coding (I frame), prediction coding (P frame), bi-directional prediction (B frame) coding etc. Generally, when coding, I frame, P frame and B frame coding are interlarded, for example based on IBBPBBP sequence.

The coding compression efficiency may get above 200:1 bit rate by B frame coding. When encoding the macro block of the B frame, four modes of Direct, Forward Prediction, Backward Prediction and Bi-directional Prediction are involved. The B frame technology needs processing forward and backward motion estimation together so high computation complexity is needed and the additional identification information should be introduced in order to distinguish the forward and backward motion vector.

In conventional video coding standards (such as MPEG-x and H.26x series), the reference frame of B frame only has one forward reference frame and one backward reference frame, while P frame only has one forward reference frame. In order to sufficiently utilize relativity of time domains between images, the P frame and B frame have been allowed to have multiple forward reference frames. However, the spending of space and time are also greatly enhanced, so there is a compromising means which adopts fixed reference frame number to limit greater space and time spending. Actually, the further the distance is, the weaker the relativity between images in time domain is, so such limitation is reasonable.

Direct mode is a code mode which processes both forward prediction and backward prediction. The forward and backward motion vectors of B frame are deduced by the motion vector of the backward reference picture, and it might not be necessary to encode the motion vector information So that the bits occupied by encoding the motion vector information can be reduced and efficiently enhance coding efficiency. Therefore Direct mode is used widely.

When encoding the P frame and B frame by using the fixed reference frame number, considering that the forward reference of P frame is more than the forward reference frame number of B frame (B frame must include a backward reference frame while P frame not include), it will result in the problem of not matching motion vector, i.e. when deducing the motion vector for B frame, the motion vectors of each block in the backward reference frame are used. For the backward reference frame is P frame, so that it maybe appear that the reference frame pointed by the motion vector is beyond the maximum forward reference frame which is possibly pointed by the B frame. For example, as shown in FIG. 1, when the number of the fixed reference frames is 2, the reference frame possibly pointed by the B frame is its two adjacent P frames, while the reference frame of P frame which is as the backward reference frame of B frame is two P frames prior to this P frame, namely to P_REF_1 and P_REF_0. When the motion vector of P frame points to the forefront P frame P_REF_1, such P frame is beyond the maximum forward reference frame which is possibly pointed by the B frame and the calculated motion vector pointing to B frame can not reach the P_REF_1. Therefore, B frame can not obtain the actual reference block for encoding, so that encoding deviation might appear and serious image distortion will be result in.

SUMMARY OF THE INVENTION

The technical problem solved by the present invention focuses on: providing a method for obtaining an actual image reference block in a Direct mode of a fixed reference frame number.

The solution of the present invention comprises the steps of:
(a) performing motion estimation for each block of a current B frame and obtaining a motion vector MV of a corresponding block of a backward reference frame;

(b) discriminating whether the motion vector is beyond a maximum forward reference frame which is possibly pointed by the B frame, if not, proceeding to step (c); else, proceeding to step (d);
(c) a forward motion vector and a backward motion vector of a macro block being able to be calculated by the following formulas: assuming $MV_F$ and $MV_B$ as a forward motion vector and a backward motion vector of a current block, $$MV_F = \frac{tb}{td} \times MV$$

$$MV_B = \frac{tb - td}{td} \times MV$$

here, tb is a distance in time domain between a current picture and a forward reference picture, and td is a distance in time domain between a forward reference picture and a backward reference picture;
(d) a forward motion vector and a backward motion vector of the macro block being able to be calculated by the following formulas: assuming $MV_F$ and $MV_B$ as a forward motion vector and a backward motion vector of a current block, $$MV_F = \frac{tb'}{td} \times MV$$

$$MV_B = \frac{tb - td}{td} \times MV$$

here, tb is a distance in time domain between a current picture and a forward reference picture, td is a distance in time domain between a forward reference picture and a backward reference picture, and tb' is a distance in time domain between the current B frame and the forward reference frame which is possibly pointed by the B frame;
(e) two image blocks pointed by the $MV_B$ and $MV_F$ being image reference blocks corresponding to the macro block.

The present invention utilizes the motion vector of the forward reference frame obtained by pointing to the B frame in same direction to replace the motion vector of the corresponding block in a backward reference frame and calculates the forward and backward motion vectors of B frame so as to solve the possible problem of un-matching motion vectors in a code mode of fixed reference frame number and guarantee the coding efficiency to the largest extent.

The solution provided by the present invention will be better understood from following, detailed description of preferred embodiments of the invention with reference to the drawings.

DETAILED DESCRIPTION OF THE PREFERRED EMBODIMENTS

Figure 1:
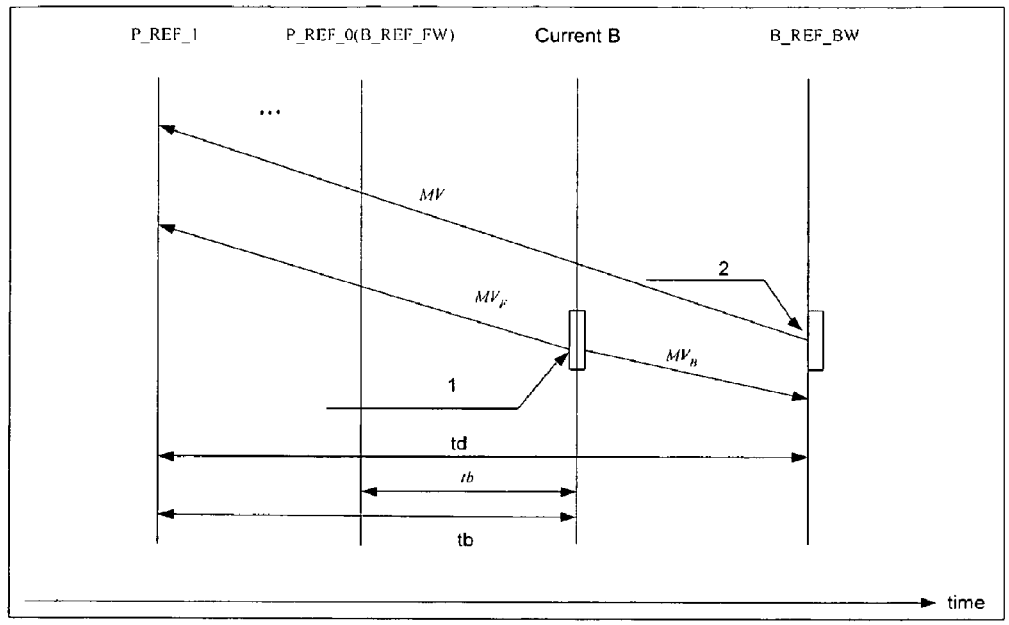
FIG. 1 is a sketch drawing showing the P frame pointing to the reference frame R_REF_1 of the prior art.

The design theory of the present invention is: firstly discriminating whether the forward reference frame pointed by the motion vector is beyond a maximum forward reference frame which is possibly pointed by the B frame, if it is not beyond, then calculating the forward motion vector of B frame by using the conventional method and obtaining the forward image reference block; if it is beyond, then using the method of minimizing the motion vector so that the calculated forward motion vector is not beyond the maximum scope of the forward reference frame which is possibly pointed by the B frame, which can obtain the actual forward image reference block.

When encoding image at the coding end, the method for obtaining an image reference block in a Direct mode of fixed reference frame number disclosed by the present invention comprises the following steps:
(a) performing motion estimation for each block of a current B frame and obtaining a motion vector MV of a corresponding block of a backward reference frame;
(b) discriminating whether the motion vector is beyond a maximum forward reference frame which is possibly pointed by the B frame, if not, proceeding to step (c); else, proceeding to step (d);
(c) a forward motion vector and a backward motion vector of a macro block being able to be calculated by the following formulas: assuming $MV_F$ and $MV_B$ as a forward motion vector and a backward motion vector of a current block, $$MV_F = \frac{tb}{td} \times MV$$

$$MV_B = \frac{tb - td}{td} \times MV$$

here, tb is a distance in time domain between a current picture and a forward reference picture, and td is a distance in time domain between a forward reference picture and a backward reference picture;
(d) a forward motion vector and a backward motion vector of the macro block being able to be calculated by the following formulas: assuming $MV_F$ and $MV_B$ as a forward motion vector and a backward motion vector of a current block, $$MV_F = \frac{tb'}{td} \times MV$$

$$MV_B = \frac{tb - td}{td} \times MV$$

here, tb is a distance in time domain between a current picture and a forward reference picture, td is a distance in time domain between a forward reference picture and a backward reference picture, and tb' is a distance in time domain between the current B frame and the forward reference frame which is possibly pointed by the B frame;
(e) two image blocks pointed by the $MV_B$ and $MV_F$ being image reference blocks corresponding to the macro block.

After obtaining the image reference block, averaging the pixels' values of the two reference blocks, obtaining a final bi-directional prediction reference block, subtracting the macro block of B frame to be coded from the bi-directional prediction reference block to obtain a block residual error, and encoding the block residual error so as to finish encoding B frame.

The present invention uses the forward reference frame to which the B frame can point to substitute the forward reference frame which is beyond the scope which B frame points to so as to solve the problem that the B frame can not obtain the image reference block when it is out of the scope. Although the image reference block obtained here is not the image reference block pointed by the backward P frame actually, however since the actual image reference block can not be obtained, the image reference block obtained by the method of the present invention is the reference block which is in the same direction as the image reference block pointed by P frame actually. Both are close due to the relativity of time domain, so the coding efficiency will not get worse by using the method. If using the fixed image block (such as using single-color image block), the coding effect will not be guaranteed; if using other methods to obtain the image block, then the relativity of time domain of the image can not be used and the coding effect also can not be predicted.

In order to guarantee that the relativity of time domain between images is used to the largest extent, tb' in step (d) is the forward reference frame of the reference frame pointed by the nearest P frame which is possibly pointed by the B frame, i.e. when B frame can not reach to the reference frame pointed by the P frame, the nearest forward reference frame which is possibly pointed by the B frame is substituted for B frame.

It can be seen from the above formula that the present invention selects the motion vectors in the same direction, of which the length is minimized to the scope which B frame can point to. This method utilizes the relativity of time domain the best. When the nearest forward reference frame which is possibly pointed by B frame is substituted for the reference frame which can be pointed by the P frame, the relativity of time domain is utilized to the largest extend. There are many methods to obtain a motion vector MV of a corresponding block of a backward reference frame in the step (a) in the present invention. Since the backward reference frame is P frame, every macro block in P frame has one motion vector MV, the key of step (a) is the correspondence between the macro blocks, i.e. which macro block in P frame is corresponding to a macro block in B frame. After the corresponding macro block is found, the motion vector MV of the macro block in P frame is the basis for calculating the forward and backward motion vectors of B frame.

Generally, using the correspondence method of same positions to determine that B frame and the backward reference frame is the corresponding macro block of P frame, i.e. the macro block in the backward reference P frame having the same position as the macro block in B frame is the corresponding block. Different algorithms may have different corresponding methods, however, by any corresponding method, the motion vector might be beyond the scope which can be pointed by the B frame.

The method disclosed by the present invention is adaptive to be used in any encoding of prediction mode. Every macro block in the current B frame has many prediction modes such as forward and backward modes, etc. The technical solution of the present invention is specifically described by taking the universal direct code mode as an example in the following, in which the number of the fixed reference frames is 2.

Firstly, the motion vector of each block of the backward reference frame relative to the forward reference frame is obtained for B frame to be encoded. Because the motion vector is from P frame, the motion vector may point to the reference frame P_REF_0 (see FIG. 2) or the reference frame P_REF_1 (see FIG. 3).

The vector MV(x,y) for deducing the motion vector of the current block of B frame in direct mode is obtained through the obtained motion vector of each block of backward reference frame, and the motion vector may come from a block of the backward reference picture having same space location as the current block, as shown in FIG. 1, it shows the direct mode partition of the current block and the co-located partition corresponding to the space location.

Certainly, other methods can deduce the motion vector. In FIG. 1, 1 denotes current coding block, 2 denotes the corresponding block having same position as P frame, and the reference signs in other drawings have the same meaning.

Figure 2:
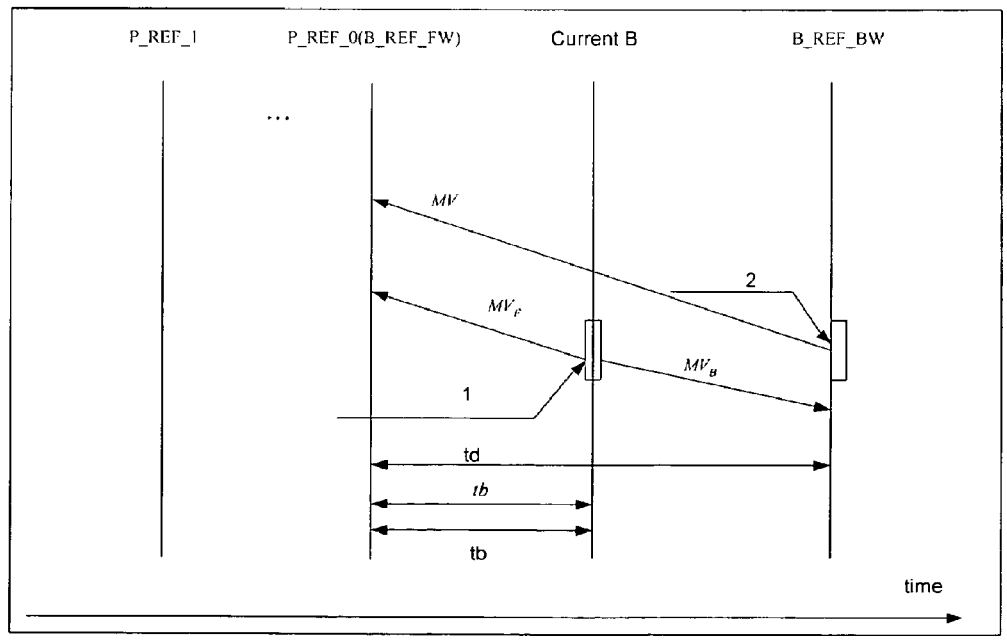
FIG. 2 is a sketch drawing showing the P frame pointing to the reference frame R_REF_0 in the embodiment of the present invention.

When pointing to the reference frame P_REF_0, as shown in FIG. 2, the reference frame is not beyond the scope of the forward reference fame which is possibly pointed by the B frame, the forward and backward motion vector of the current block can be obtained according to the motion vector of the backward corresponding block:

$$MV_F = \frac{tb}{td} \times MV$$

$$MV_B = \frac{tb - td}{td} \times MV$$

$MV_F$ and $MV_B$ are the forward motion vector and the backward motion vector corresponding to the current block. Here, tb is a distance in time domain between a current picture and a forward reference picture, td is a distance in time domain between a forward reference picture and a backward reference picture, and MV denotes the motion vector of the corresponding part of the backward reference picture relative to the forward reference frame.

Figure 3:
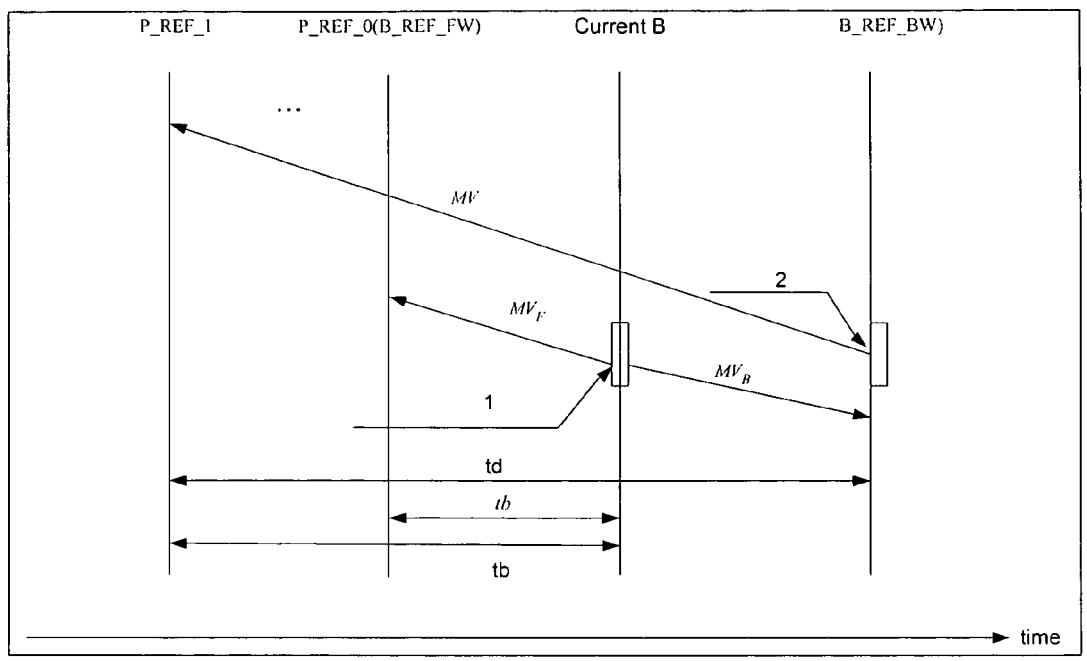
FIG. 3 is a sketch drawing showing the P frame pointing to the reference frame R_REF_1 in the embodiment of the present invention.

When pointing to the reference frame P_REF_1, as shown in FIG. 3, the reference frame is beyond the scope of the forward reference frame which is possibly pointed by the B frame. For the image macro block of the reference frame, the B frame can not obtain. Therefore it is necessary to substitute the image block of the P_REF_0 for the image block of the P_REF_1, so that the forward and backward motion vector of the current block can be obtained according to the motion vector of the backward corresponding block:

$$MV_F = \frac{tb'}{td} \times MV$$

$$MV_B = \frac{tb - td}{td} \times MV$$

Here, tb' is a distance in time domain between the current B frame and the forward reference frame P_REF_0, and $MV_F$ and $MV_B$ are the forward motion vector and the backward motion vector corresponding to the current block. Here, tb is a distance in time domain between a current picture and a forward reference picture, td is a distance in time domain between a forward reference picture and a backward reference picture, and MV denotes the motion vector of the corresponding part of the backward reference picture relative to the forward reference frame.

The two image blocks pointed by $MV_B$ and $MV_F$ are the image reference blocks corresponding to the macro block. After obtaining the image reference block, average the pixels' values of the two reference blocks so as to obtain a final bi-directional prediction reference block, subtract the macro block of B frame to be encode from the bi-directional prediction reference block to obtain a block residual error, and encode the block residual error so as to finish encoding B frame.

The decoding procedure is the inverse procedure of encoding, the procedure is as follows:

firstly, discriminating the prediction mode of the current block, if it is a direct mode, then proceeding to the following steps; if it is other prediction mode, then proceeding to the corresponding procedure;

obtaining the motion vector MV for deducing in the backward reference frame from the code stream; if the reference frame corresponding to the motion vector MV is not beyond the maximum forward reference block which is possibly pointed by B frame, then the forward and backward motion vectors being able to be obtained from the following formulas:

$$MV_F = \frac{tb}{td} \times MV$$

$$MV_B = \frac{tb - td}{td} \times MV$$

$MV_F$ and $MV_B$ are the forward motion vector and the backward motion vector corresponding to the current block. Here, tb is a distance in time domain between a current picture and a forward reference picture, td is a distance in time domain between a forward reference picture and a backward reference picture, and MV denotes the motion vector of the corresponding part of the backward reference picture relative to the forward reference frame.

If the reference frame corresponding to the motion vector MV is beyond the maximum forward reference block which is possibly pointed by B frame, then the forward and backward motion vectors can be obtained from the following formulas:

$$MV_F = \frac{tb'}{td} \times MV$$

$$MV_B = \frac{tb - td}{td} \times MV$$

Here, tb' is a distance in time domain between the current B frame and the forward reference frame P_REF_0, a final bi-directional prediction reference block can be obtained by averaging the pixels' values corresponding to prediction pointed by the $MV_B$ and $MV_F$, and a current image block is formed by adding the bi-directional prediction reference block and the corresponding block residual error so as to finish the whole decoding procedure.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for obtaining an image reference block in a picture in a code mode of fixed reference frame number in image encoding/decoding of digital video, comprising the steps of:
   (a) performing motion estimation for each block of a current B frame and obtaining a motion vector MV of a corresponding block of a backward reference frame;
   (b) discriminating whether a reference frame corresponding to the motion vector is beyond a maximum forward reference frame which is pointed by the B frame, if not, proceeding to step (c); else, proceeding to step (d);
   (c) a forward motion vector and a backward motion vector of a macro block being able to be calculated by the following formulas: assuming $MV_F$ and $MV_B$ as a forward motion vector and a backward motion vector of a current block, $$MV_F = \frac{tb}{td} \times MV$$

$$MV_B = \frac{tb - td}{td} \times MV$$

here, tb is a distance in time domain between a current picture and a forward reference picture, and td is a distance in time domain between a forward reference picture and a backward reference picture;
   (d) a forward motion vector and a backward motion vector of the macro block being able to be calculated by the following formulas: assuming $MV_F$ and $MV_B$ as a forward motion vector and a backward motion vector of a current block, $$MV_F = \frac{tb'}{td} \times MV$$

$$MV_B = \frac{tb - td}{td} \times MV$$

here, tb is a distance in time domain between a current picture and a forward reference picture, td is a distance in time domain between a forward reference picture and a backward reference picture, and tb' is a distance in time domain between the current B frame and the forward reference frame which is pointed by the B frame;
   (e) two image blocks pointed by the $MV_B$ and $MV_F$ being image reference blocks corresponding to the macro block.

2. The method for obtaining an image reference block in a code mode of fixed reference frame number as claimed in claim 1, wherein said obtaining a motion vector MV of a corresponding block of a backward reference frame in said step (a) includes: selecting a macro block with the same position as a macro block to be encoded in B frame to be a corresponding macro block from a backward reference P frame, and obtaining a motion vector of the macro block in P frame.

3. The method for obtaining an image reference block in a code mode of fixed reference frame number as claimed in claim 1, wherein said discriminating whether a reference frame corresponding to the motion vector of the corresponding block in the backward reference frame is beyond a maximum forward reference frame which is pointed by the B frame in step (b) includes: comparing whether a time domain obtaining the maximum forward reference frame which is pointed by the B frame is larger than or equals to a time domain of a forward reference frame pointed by the motion vector of the corresponding block in the backward reference frame, if yes, then not beyond the maximum forward reference frame which is pointed by the B frame; else, beyond it.

* * * * *